Jan. 16, 1940.    A. G. W. WEDBERG    2,187,672
THREE PLY FLOORING
Filed Sept. 27, 1934
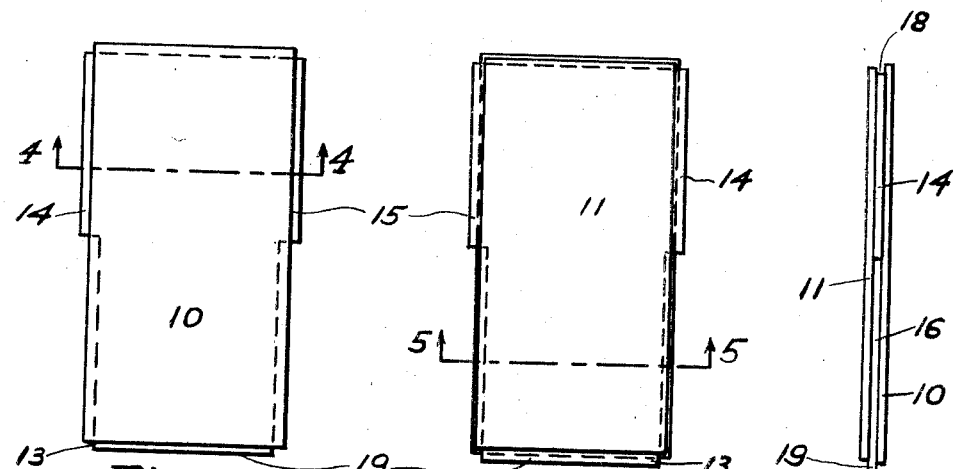
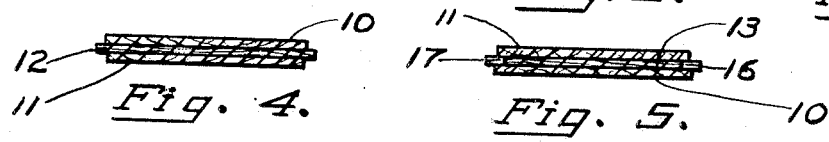
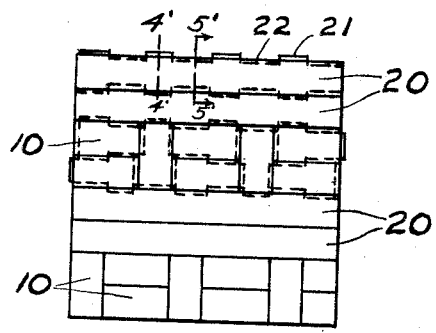
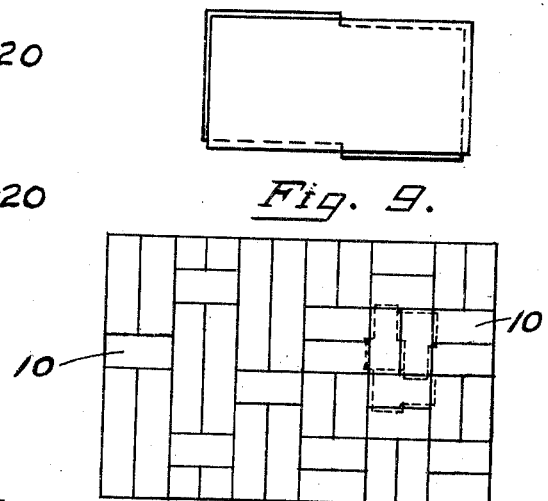
INVENTOR.
Axel. G. W. Wedberg Patented Jan. 16, 1940

2,187,672

UNITED STATES PATENT OFFICE 2,187,672

THREE PLY FLOORING

Axel G. W. Wedberg, Chicago, Ill.

Application September 27, 1934, Serial No. 745,727

1 Claim. (Cl. 20—8)

This invention relates to improvement in flooring and the like. The invention concerns itself especially with improvements in wood block flooring made in three plies of which the center ply forms tongues and grooves in alternation around the periphery of the edge of the blocks, so when set together the blocks establish the desired continuity of surface.

According to the present invention I make the flooring blocks from three plies of material, which are so related and sized that the edge portions of the center ply in conjunction with the top and bottom plies provides the desired tongues and grooves. By running the grain of the center ply in the opposite direction to the top ply, and by gluing together all plies with highly water resisting glues, the strength and rigidity of the blocks are greatly improved, also practically eliminating expansion or warping of the flooring blocks.

In connection with this three-ply flooring blocks it is a further feature, in some cases, to make the bottom ply slightly smaller in size than the top ply, so that when the blocks are set together into the flooring assembly the top or surface plies of adjoining blocks will come definitely and evenly into edge contact, and so that the bottom plies will not interfere with such result, and at the same time it will leave a space between the edges of the bottom plies to serve as a mastic groove for the mastic into which this floor may be laid.

Another object, with the top ply and bottom ply of substantially the same size is to have some portions of the center ply set back from the edges of the top ply to form grooves and the other portions of the center ply extend beyond the edges of the top ply so as to hold together the edges of the top and bottom ply to its extreme edges at intervals where it changes from a groove to a tongue and with the tongues and grooves in alternation or staggered the grooves are held together making the tongue and groove connection unusually strong, eliminating curling and cracking of edges, loose and uneven joints and squeaking of floors.

Another object is to so arrange the center ply that blocks which have a length equal to twice their width can be used in conjunction with other identical blocks, or with long planks, and still obtain the same tongue and groove interlocking of the edges depending on the fact that the tongues or grooves in alternation will change at intervals in distance equal to the widths of the short blocks.

Another object is to apply this invention in making of long planks by arranging the center ply so that the desired tongues and grooves are provided in alternate relation or staggered position at the edges of blocks for interlocking the edges of adjoining planks.

Other objects and uses of the invention will appear from a detailed description of the same which consists in the features of construction and combinations of parts hereinafter described and claimed.

In the drawing:

Figure 1 shows a top face view of a flooring block embodying the features of the present invention;

Figure 2 shows a bottom face view corresponding to Figure 1;

Figure 3 shows an edge view corresponding to Figures 1 and 2;

Figure 4 shows a cross-section on the line 4—4 of Figure 1 looking in the direction of the arrows;

Figure 5 shows a cross-section on the line 5—5 of Figure 2 looking in the direction of the arrows;

Figure 6 shows a face view of a section of flooring made up from blocks embodying the present invention, and showing how said blocks may be set together;

Figure 7 shows a view similar to Figure 6 but illustrating a modified form of arrangement in which the flooring is partly made up from blocks which are longer than other blocks, so that such long blocks engage several of the short blocks, and so that a modified appearance of the flooring is produced;

Figure 8 shows a view similar to that of Figure 7, but illustrating still another arrangement of assembly of long and short blocks so as to produce still another appearance of the flooring; and Figure 9 shows a modified form of block in which the tongues and grooves are arranged in modified form.

Referring first to Figures 1 to 5 inclusive, the block has a top ply 10 which is rectangular in shape and a bottom ply 11 also rectangular in shape. All plies are relatively thin and made up of wood or any other materials desired. The grain of the wood in the center plies 12 and 13 runs in the opposite direction to the top ply. The center ply 12 projects beyond the side edges of the top ply 10 to form tongues 14 and 15 on each side of the block, whereas the center ply 13 terminates short of said side edges to form grooves 16 and 17 on each side at the other portion of the block. It is also noted that the center ply 12 is set back from end of the face ply 10 to provide an end groove 18, whereas the center ply 13 projects beyond the end of the top ply 10 at the other end of the block to form an end tongue 19, whereby the center ply alternately projects beyond and terminates short of the edges of the outside plies to form tongues and grooves, and changes from a tongue to a groove at intervals of the distance substantially equal to the width of the block around the entire perimeter of the block.

Also it will be seen that with this arrangement, such block is provided with tongues and grooves alternating around its periphery, so that when the blocks are set together in any of the manners which they are intended to co-operate, the tongues of certain blocks enter into and engage the grooves of the other blocks to produce a completely interlocked and intermeshed flooring.

In the modified arrangement shown in Figure 9 the middle ply is so shaped that the projecting or tongue portions do not lie opposite to each other, not do the groove portions lie opposite to each other, but rather, a groove comes opposite to a tongue at every portion of the block.

Referring to Figure 6, I have therein shown how blocks such as those of Figures 1 to 5 inclusive may be set together into the flooring, some of the blocks being shown in direct contact and engagement with each other, and others being set into their proper relative positions, but not in actual tongue and groove engagement with each other. It will be seen that when the blocks are set together the tongues enter into the grooves to interlock and produce the desired interengagement.

In the arrangement of Figure 7 some of the blocks are much longer than others. These are designated 20. The cross-section of a single plank 20 on the line 4'—4' is the same as the cross-section shown in Figure 4, and on the line 5'—5' it is the same as the cross-section shown in Figure 5. In each of these blocks the center ply is so formed that it produces tongues 21 and grooves 22 alternating with each other along the edges of the block and as the blocks are set together the tongues of one block enter into and engage the grooves of the other block. It will also be noted in this figure that these long blocks are interrelated with certain shorter blocks so that there is produced a very pleasing and beautiful appearance of flooring.

Examination of Figure 8 shows other arrangements; on the left hand side is shown long blocks are used together with the short ones, and on the right hand side is produced an appearance of square block flooring by placing two blocks together in each square. But in any case where long planks are used in conjunction with short blocks of standard size, the interlocking of edges around the periphery of any size blocks or long planks is the same as already described.

While I have herein shown and described only certain features of my present invention, still I do not intend to limit myself thereto, except as I may do so in the claim.

I claim:

In a flooring block, top and bottom plies of counterpart formation, said plies being of regular oblong shape, a center ply of lesser width and length than said top and bottom plies and inserted therebetween from one end of the block whereby opposed lateral grooves are formed in the block, one end of said center ply protruding beyond the corresponding end of said top and bottom plies, and a second ply of greater width and lesser length than said top and bottom plies inserted therebetween from the opposite end of said block into contact with said first named center ply, said second center ply extending beyond the lateral edges of said top and bottom plies and its end remote from said first named center ply being spaced inwardly from the corresponding ends of said top and bottom plies.

AXEL G. W. WEDBERG.